(12) United States Patent
Stan et al.

(10) Patent No.: US 9,119,350 B2
(45) Date of Patent: Sep. 1, 2015

(54) GRAIN CLEANING METHOD FOR AN AGRICULTURAL COMBINE

(71) Applicant: CNH Industrial America LLC, New Holland, PA (US)

(72) Inventors: Octavian Stan, Davenport, IA (US); Karl Robert Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/317,831

(22) Filed: Jun. 27, 2014

(65) Prior Publication Data

US 2014/0308997 A1    Oct. 16, 2014

Related U.S. Application Data

(62) Division of application No. 13/706,868, filed on Dec. 6, 2012, now Pat. No. 8,821,229.

(51) Int. Cl.
| | | |
|---|---|---|
| *A01F 12/48* | (2006.01) | |
| *B07B 1/55* | (2006.01) | |
| *B08B 5/00* | (2006.01) | |
| *A01F 12/44* | (2006.01) | |
| *A01D 41/127* | (2006.01) | |
| *A01D 75/28* | (2006.01) | |

(52) U.S. Cl.
CPC ............ *A01F 12/44* (2013.01); *A01D 41/1276* (2013.01); *A01D 75/282* (2013.01); *A01F 12/444* (2013.01)

(58) Field of Classification Search
CPC ..... A01F 12/444; A01F 12/44; A01F 12/442; A01F 12/446; A01F 12/48; A01F 12/448; A01F 12/18; A01D 75/282; A01D 41/1276; Y10S 460/901; Y10S 460/902; Y10S 460/903
USPC ............ 460/99, 100, 98, 101, 97, 8; 56/16.5, 56/14.6

See application file for complete search history.

(56) References Cited

U.S. PATENT DOCUMENTS

| | | |
|---|---|---|
| 875,550 A | 12/1907 | McCorkell |
| 1,050,540 A | 1/1913 | Hohman |
| 1,884,114 A | 10/1932 | Moroney |
| 2,324,754 A | 7/1943 | Barber |
| 2,682,951 A | 7/1954 | Hamburg |

(Continued)

FOREIGN PATENT DOCUMENTS

| | | |
|---|---|---|
| FR | 977033 | 3/1951 |
| GB | 2014025 | 8/1979 |
| JP | 06197622 | 7/1994 |

*Primary Examiner* — Árpád Fábián-Kovács
(74) *Attorney, Agent, or Firm* — Patrick M. Sheldrake; Seyed V. Sharifi T.

(57) ABSTRACT

A method of clearing a grain cleaning system of an agricultural combine is provided. The method includes the step of providing and directing a flow of high velocity air in a first direction about an inlet end of a cleaning shoe. The method further includes the step of monitoring the cleaning shoe in order to detect a change in an operational parameter of the cleaning shoe, wherein the operational parameter is one of a transient effect of a sieve of the cleaning shoe, a flow rate about and exit end of the cleaning shoe and a flow velocity about an exit end of the cleaning shoe. Further, the method includes the step of redirecting the flow of high velocity air about the inlet end of the cleaning shoe in a second direction in response to a detected change in the operational parameter.

8 Claims, 12 Drawing Sheets

(56) References Cited

U.S. PATENT DOCUMENTS

| | | | |
|---|---|---|---|
| 2,849,118 A * | 8/1958 | Ashton | 209/318 |
| 3,437,262 A * | 4/1969 | Eck et al. | 415/53.1 |
| 3,469,773 A | 9/1969 | Everett et al. | |
| 3,664,349 A | 5/1972 | Quick | |
| 3,800,804 A | 4/1974 | Boone | |
| 3,813,184 A | 5/1974 | Temple et al. | |
| 3,833,006 A * | 9/1974 | Temple | 460/99 |
| 4,017,206 A | 4/1977 | Dode et al. | |
| 4,259,829 A | 4/1981 | Strubbe | |
| 4,303,079 A * | 12/1981 | Claas et al. | 460/99 |
| 4,307,732 A | 12/1981 | De Busscher et al. | |
| 4,314,571 A | 2/1982 | DeBusscher et al. | |
| 4,353,376 A * | 10/1982 | Schuler | 460/67 |
| 4,466,230 A | 8/1984 | Osselaere et al. | |
| 4,466,231 A | 8/1984 | Rowland-Hill et al. | |
| 4,527,241 A | 7/1985 | Sheehan et al. | |
| 4,589,425 A | 5/1986 | Mitchell, Jr. | |
| 4,875,889 A | 10/1989 | Hagerer et al. | |
| 5,098,341 A | 3/1992 | Kuchar | |
| 5,376,046 A | 12/1994 | Shuknecht et al. | |
| 5,387,154 A | 2/1995 | Peters | |
| 5,428,945 A * | 7/1995 | von Allworden et al. | 56/12.8 |
| 5,558,576 A | 9/1996 | Meyers | |
| 5,599,162 A * | 2/1997 | Ricketts et al. | 415/53.1 |
| 5,624,315 A | 4/1997 | Jonckheere | |
| 5,775,072 A * | 7/1998 | Herlitzius et al. | 56/10.2 R |
| 6,632,136 B2 | 10/2003 | Anderson et al. | |
| 6,773,343 B2 | 8/2004 | Grywacheski et al. | |
| 6,863,604 B2 | 3/2005 | Behnke | |
| 6,869,355 B2 | 3/2005 | Bernhardt et al. | |
| 6,921,330 B2 | 7/2005 | Grywacheski et al. | |
| 7,403,846 B2 | 7/2008 | Maertens et al. | |
| 7,413,507 B2 | 8/2008 | Weichholdt | |
| 7,584,663 B2 | 9/2009 | Missotten et al. | |
| 7,630,808 B2 | 12/2009 | Behnke et al. | |
| 7,645,190 B2 | 1/2010 | Schwinn et al. | |
| 7,670,218 B2 | 3/2010 | Behnke et al. | |
| 7,713,115 B2 | 5/2010 | Behnke et al. | |
| 7,841,931 B2 * | 11/2010 | Straeter | 460/101 |
| 7,846,013 B1 | 12/2010 | Diekhans | |
| 8,038,518 B2 | 10/2011 | Marvin et al. | |
| 8,052,374 B2 | 11/2011 | Ricketts | |
| 8,118,649 B1 | 2/2012 | Murray et al. | |
| 8,221,064 B2 * | 7/2012 | Ricketts et al. | 415/184 |
| 2002/0037758 A1 | 3/2002 | Visagie et al. | |
| 2005/0150202 A1 | 7/2005 | Quick | |
| 2007/0135935 A1 | 6/2007 | Maertens et al. | |
| 2009/0036184 A1 | 2/2009 | Craessaerts et al. | |
| 2009/0280876 A1 | 11/2009 | Yoder et al. | |
| 2009/0299564 A1 | 12/2009 | Sheidler et al. | |
| 2010/0178171 A1 | 7/2010 | Ricketts | |
| 2012/0184339 A1 | 7/2012 | Schulz | |

* cited by examiner

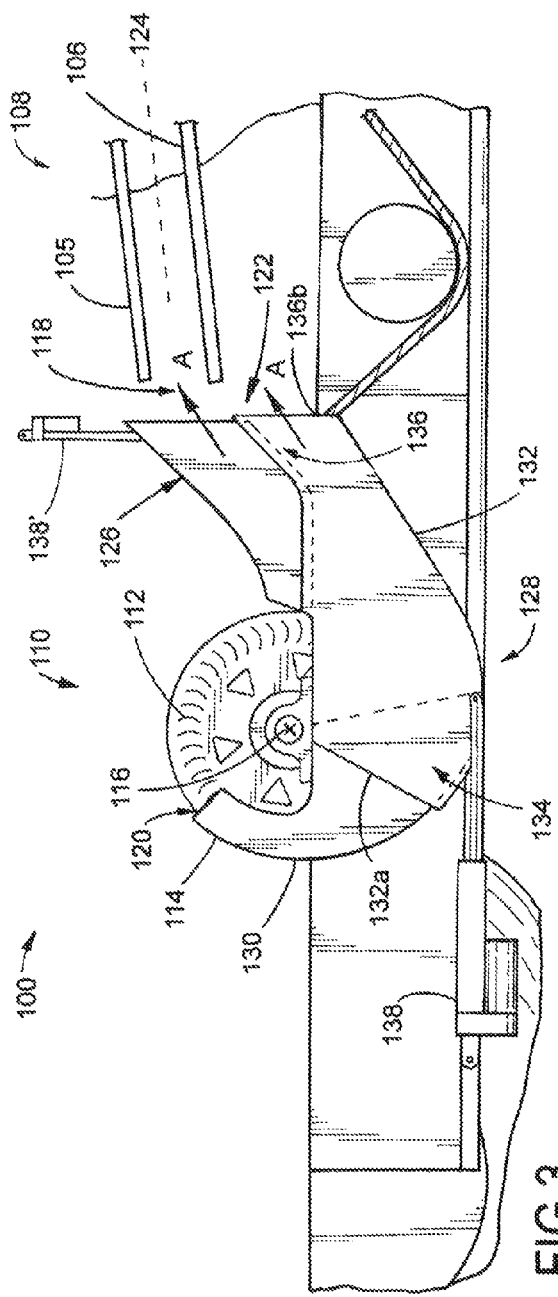
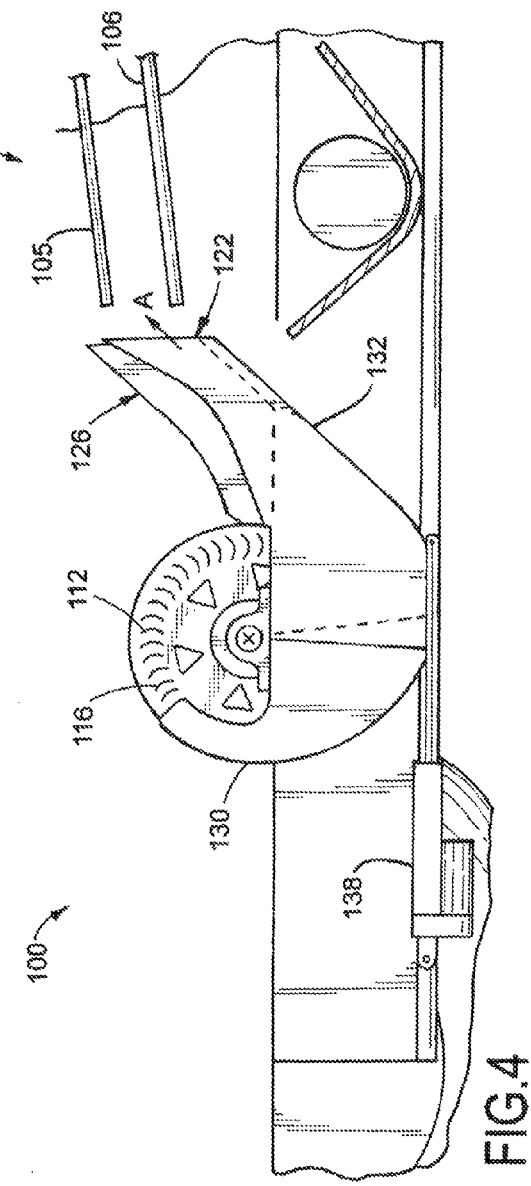
FIG.3
FIG.4

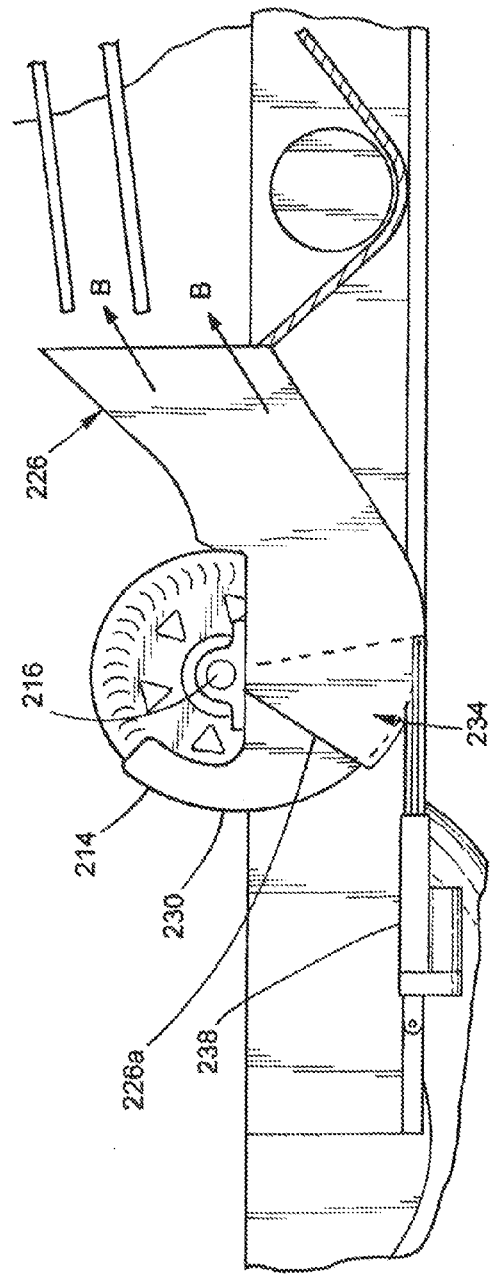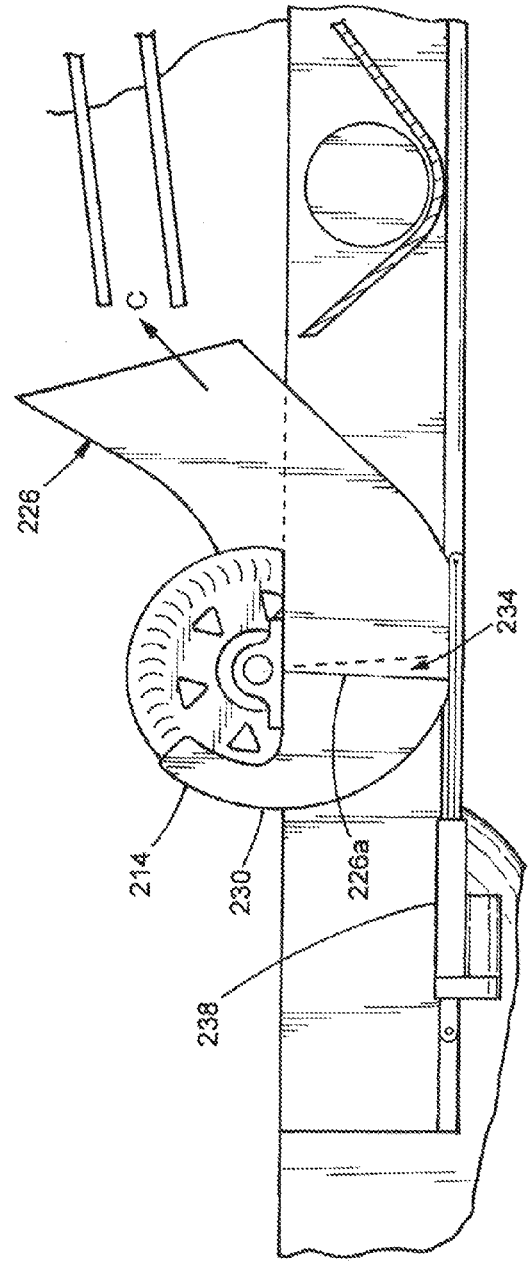

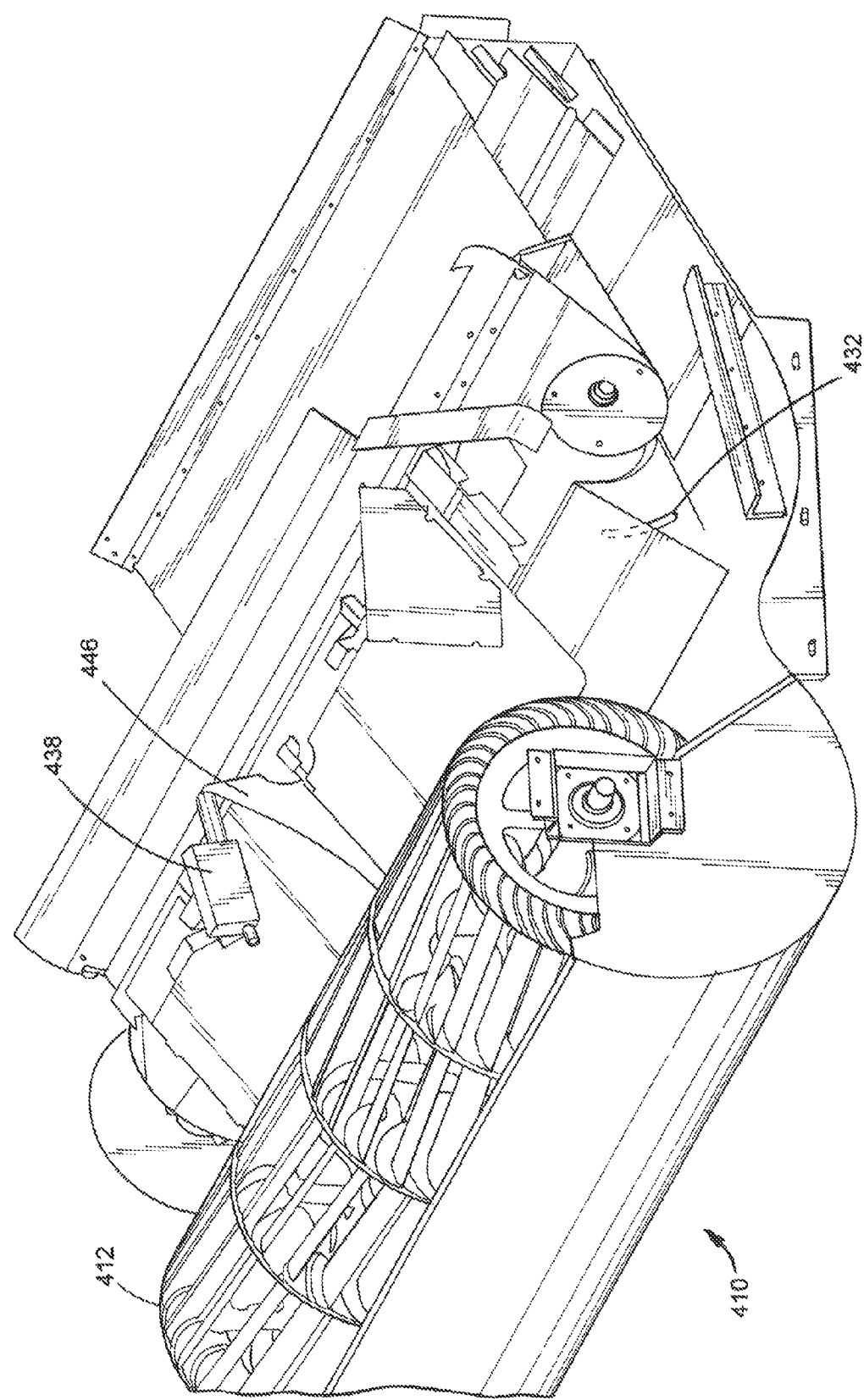

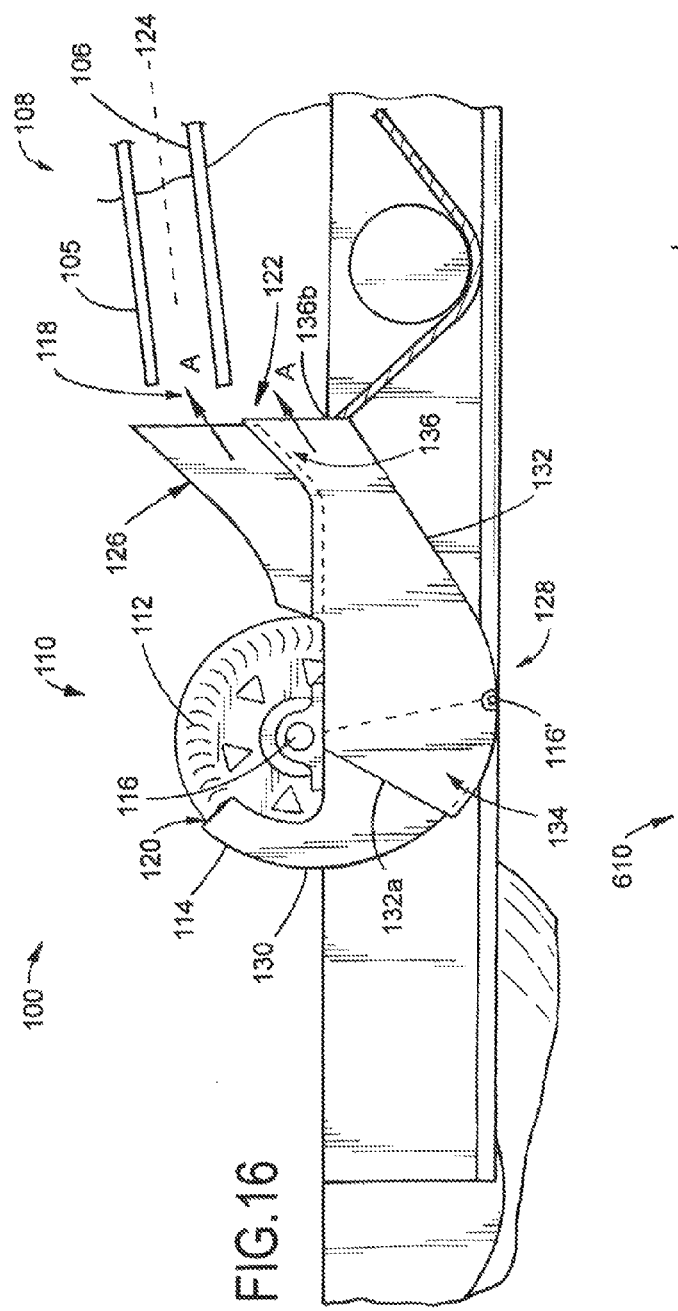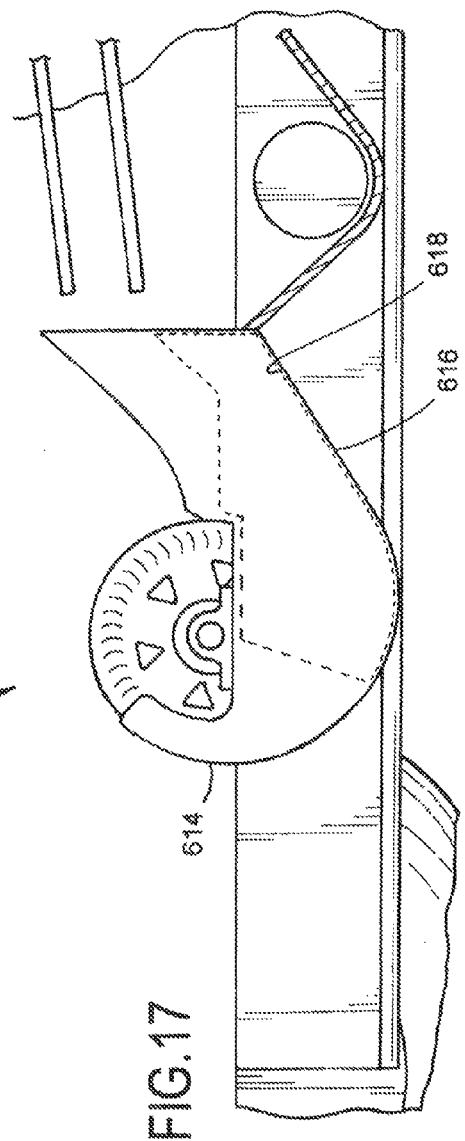

GRAIN CLEANING METHOD FOR AN AGRICULTURAL COMBINE

This divisional application claims priority under 35 U.S.C. §120 from co-pending U.S. patent application Ser. No. 13/706,868 filed on Dec. 12, 2012 by Octavian Stan and Karl R. Linde with the same title, the full disclosure of which is hereby incorporated by reference.

BACKGROUND OF THE INVENTION

The present invention relates generally to agricultural combines. In particular, the present invention relates to a grain cleaning system of an agricultural combine that includes a blower having an adjustable air flow distribution.

Modern combine harvesters can be used for harvesting and threshing a wide range of agricultural products. Combine harvesters include a threshing mechanism where the crop material is threshed in order to separate grains from the discardable part of the crop, and grain cleaning systems where clean grain kernels are separated from other crop particles. In particular, in typical combine harvesters for harvesting crop material, grain is threshed and separated in a threshing and separating mechanism and the separated grain, together with impurities of all sorts, such as chaff, dust, straw particles and tailings, are fed to a cleaning system or mechanism for cleaning. Clean grain is collected below the cleaning system and fed to a grain tank for temporary storage. The tailings are separated from the clean grain and impurities by means of sieves and provisions are taken for recycling the tailings through the combine harvester for reprocessing. This reprocessing involves either recycling the tailings through the threshing and separating mechanism and/or treating them in a separate tailings rethresher means.

Cleaning systems are operated under a wide range of conditions, which sometimes result in a temporary overload of the sieve sections. Cleaning systems in combine harvesters may be temporarily heavily disturbed by local field and crop conditions, such as for instance rapid slope variations or an abrupt increase in crop throughput when the harvester is driven from a low yield spot into a zone with higher yields. Disturbance may also be caused by wrong separation or cleaning settings, difficult cleaning conditions (e.g., from a large amount of green material), or when the threshing settings of the combine harvester are not properly adjusted for harvesting conditions. Such disturbances are known as "transient effects" on the cleaning system and can result in a sudden overload of the cleaning system, e.g., where a heap of crop material accumulates locally on the upper sieve of the cleaning system such that the cleaning system can not fulfill its function. Moreover, a constant overload of the cleaning system ultimately may lead to a substantial rise of the tailings flow ending up with excessive cleaning losses and with blockages of the tailings return system.

Increasing the speed and capacity of the combine is limited by the capacity of the cleaning system to separate the material other than grain ("MOG") and keep the grain losses within acceptable limits in both flat and hilly conditions. Current technologies provide a partial solution to changes in both incoming crop material quantity and distribution/thickness of crop material on the sieves. Commonly, the operator attempts to reduce sieve losses in such cases by ground speed control strategies, in particular by reducing the ground speed. However, it is not useful to apply ground speed variations once a heap of crop material is present on the upper sieve section because it takes a considerable amount of time to recover from the transient effect such that a significant amount of crop will be lost before the effects of the new speed have stabilized. Furthermore, the sudden increase of sieve losses disturbs the closed loop behavior of automatic grain loss control algorithms and causes serious discomfort to the operator, when operating in automatic ground speed control mode.

Other techniques to address transient effects, especially in hilly conditions, is to respond to crop material thickness variations on top of the sieve by varying the fan speed of a blower of the cleaning shoe. Unfortunately, when increased fan speed and air flow is being used to penetrate the increased thickness of the crop material in the front of the cleaning system based on the slope the air finds the least resistant path which would also effect the air flow and velocity at the rear of the cleaning system leading to unacceptable grain losses, forcing the operator to reduce the harvesting speed in order to limit grain losses.

Thus, a need still exits for a cleaning system capable of addressing the aforementioned defects of current cleaning systems for handling transient effects. Such a need is satisfied by the cleaning system and method of the present invention.

BRIEF SUMMARY OF THE INVENTION

In accordance with a preferred embodiment, the present invention provides a method of clearing a grain cleaning system of an agricultural combine that includes the steps of providing and directing a flow of high velocity air in a first direction about an inlet end of a cleaning shoe, monitoring the cleaning shoe in order to detect a change in an operational parameter of the cleaning shoe, and redirecting the flow of high velocity air about the inlet end of the cleaning shoe in a second direction in response to a detected change in the operational parameter.

In accordance with another preferred embodiment, the present invention provides an agricultural combine that includes a support structure, a grain cleaning system and a controller. The grain cleaning system is mounted to the support structure and includes a cleaning shoe having a sieve, a sensor for sensing at least one operational parameter of the cleaning shoe, and a blower for blowing a flow of air into the cleaning shoe. The controller is operatively connected to and in communication with the blower and the sensor. The blower is configured to provide a flow of air between at least a first direction and a second direction to blow the flow of air into the cleaning shoe about a plurality of directions in response to the sensor sensing a change in the at least one operational parameter.

In accordance with yet another preferred embodiment, the present invention provides a method of clearing a grain cleaning system of an agricultural combine that includes the steps of providing a blower for generating a flow of air in a first direction about an inlet end of a cleaning shoe, monitoring the flow of air generated by the blower in order to detect a change in an operational parameter of the blower, and modifying at least one of a direction, velocity and pressure of the flow of air in response to a detected change in the operational parameter.

In accordance with another preferred embodiment, the present invention provides an agricultural combine that includes a support structure, a grain cleaning system and a controller. The grain cleaning system is mounted to the support structure. The grain cleaning system includes a cleaning shoe having a sieve, a blower for blowing a flow of air into the cleaning shoe, and a sensor for sensing at least one operational parameter of the blower. The controller is operatively connected to and in communication with the blower and the sensor. The blower is configured to provide a flow of air between at least a first direction and a second direction to blow the flow of air into the cleaning shoe about a plurality of directions in response to the sensor sensing a change in the at least one operational parameter.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is a partial side elevation view of the grain cleaning system of FIG. 2;

FIG. 4 is a partial side elevation view of the grain cleaning system of FIG. 3 with a portion of a blower housing moved to a reduced outlet opening position;

FIG. 6 is a partial side elevation view of a grain cleaning system in accordance with another preferred embodiment of the present invention;

FIG. 7 is a partial side elevation view of the grain cleaning system of FIG. 6 with a portion of the blower housing moved to a secondary position;

FIG. 11 is a top perspective view of the grain cleaning system of FIG. 10;

FIG. 16 is a partial side elevation view of a grain cleaning system in accordance with another preferred embodiment of the present invention; and FIG. 17 is a partial side elevation view of a grain cleaning system in accordance with yet another preferred embodiment of the present invention.

DETAILED DESCRIPTION OF THE INVENTION

Figure 1:
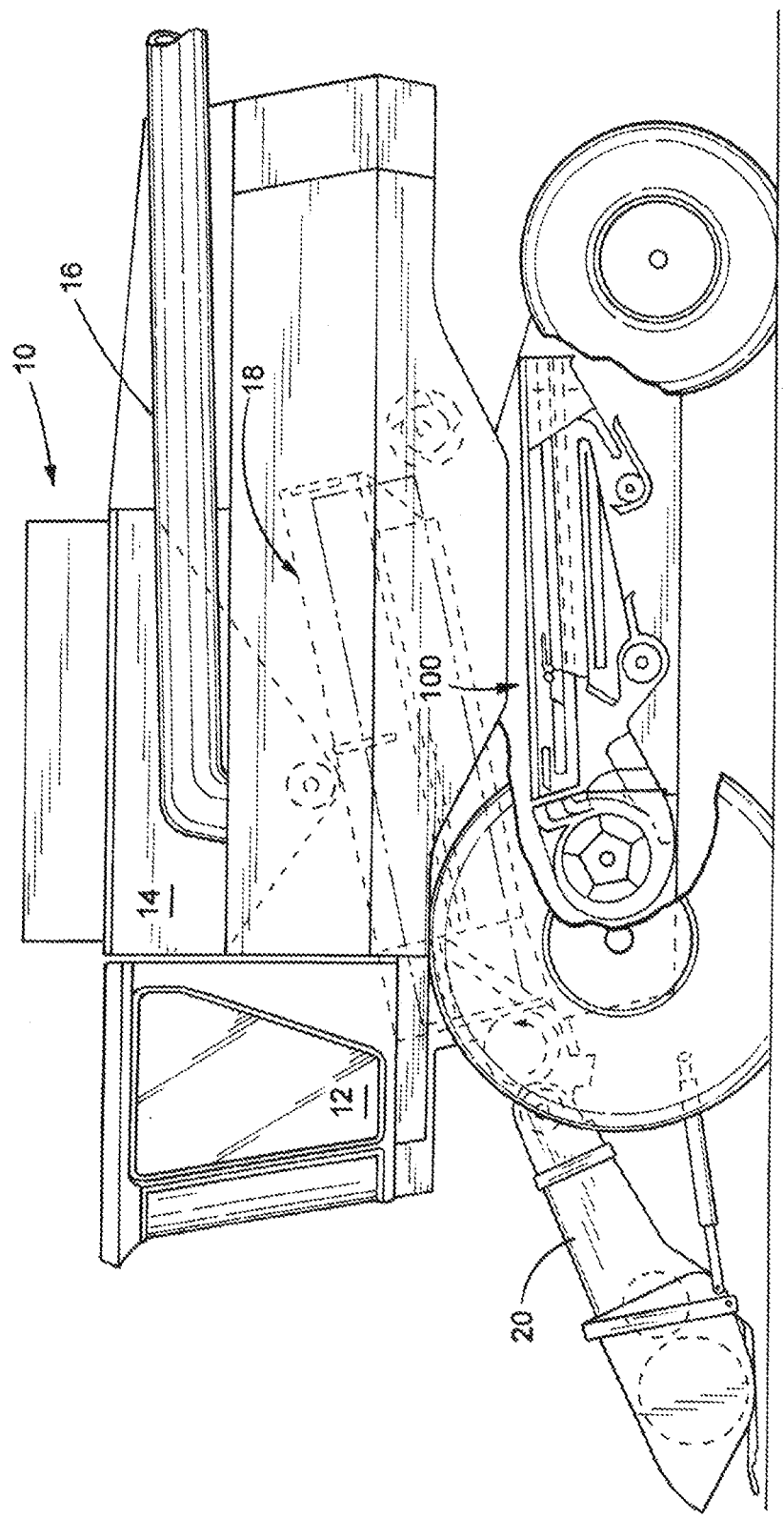
FIG. 1 is a side elevation view of an agricultural combine in accordance with a preferred embodiment of the present invention.

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Referring to FIGS. 1-5, in a preferred embodiment, the present invention provides an agricultural combine 10 having a grain cleaning system 100. The agricultural combine 10 includes, among other components, a cab 12, a grain tank 14, an unloading auger 16, a threshing and separating section 18, and a feederhouse 20. Such components of the agricultural combine 10 are known and therefore a detailed description of their structure, function and operation is not necessary for a complete understanding of the present invention. However, a further description of such agricultural combine components are disclosed in U.S. Patent Application Publication No. 2012/0184339, the entire disclosure of which is hereby incorporated by reference herein in its entirety.

Figure 2:
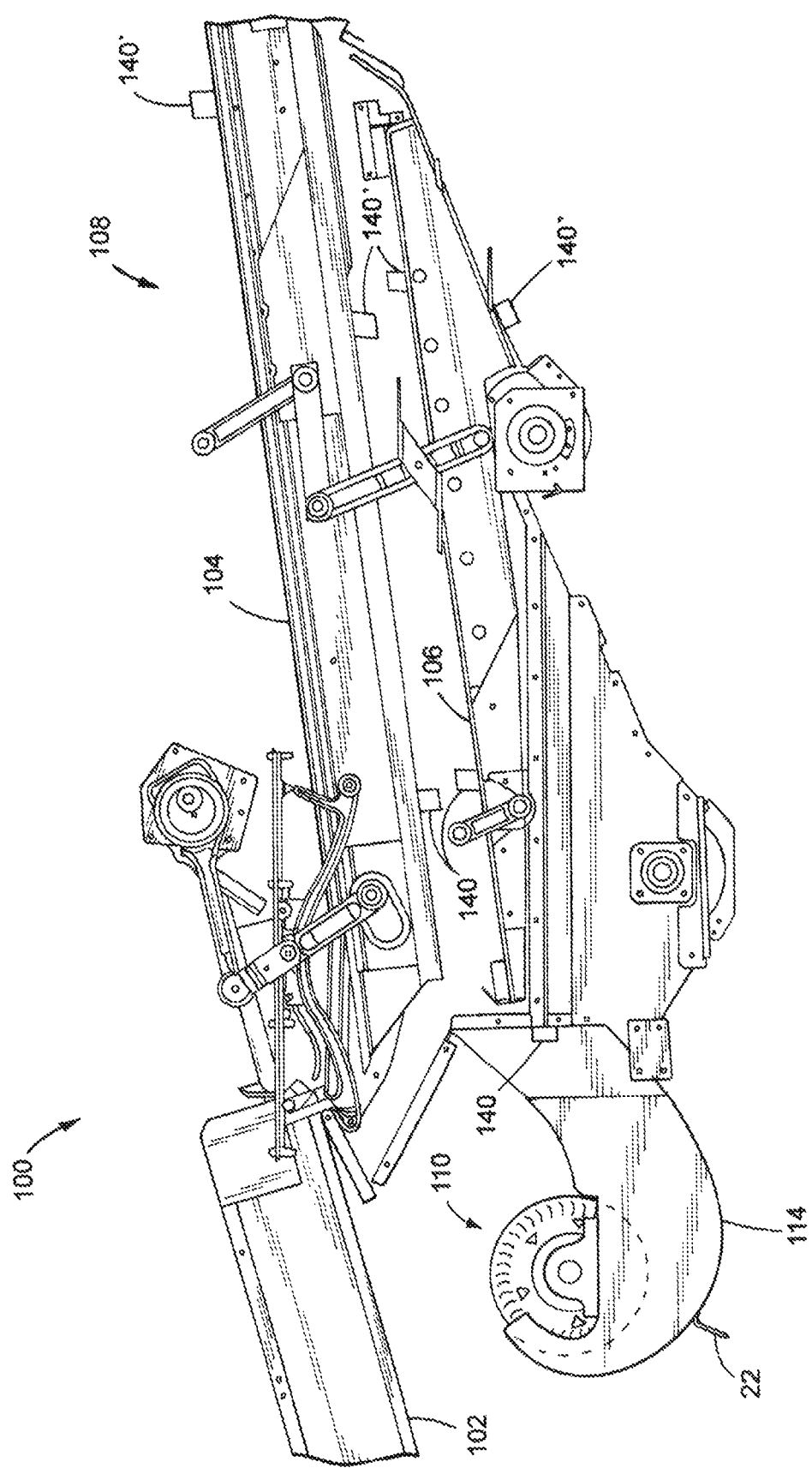
FIG. 2 is a partial side elevation view of a grain cleaning system of the agricultural combine of FIG. 1.
Figure 2A:
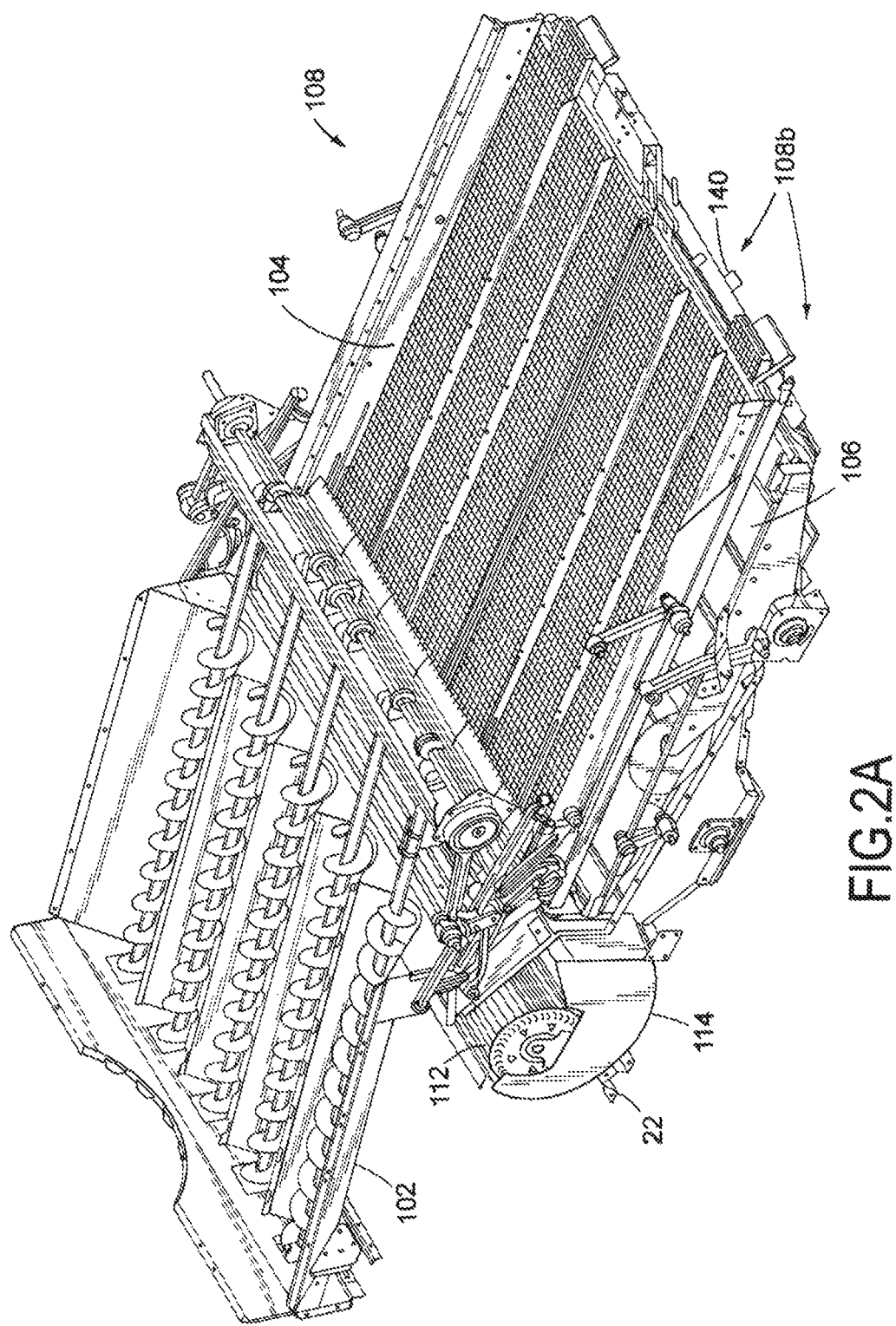
FIG. 2A is a top perspective of the grain cleaning system of FIG. 2.

Referring to FIG. 2, the agricultural combine 10 includes a support structure 22 onto which the grain cleaning system 100 is attached or mounted to. The support structure 22 can be any portion of the agricultural combine's frame, chassis or other support member.

The grain cleaning system 100 applicable to the present invention can include a first grain pan 102, a pre-cleaning sieve positioned above a second grain pan, an upper sieve 104 and a lower sieve 106. The upper and lower sieves 104, 106 are positioned within a cleaning shoe 108 that functions to house and operate the sieves 104, 106. The cleaning shoe 108 constitutes the framework of reinforcement girders surrounding the upper and/or lower sieves. Alternatively, the grain cleaning system of a combine applicable to the present invention can include an auger bed instead of a grain pain. Such auger beds and grain pains as well known in the art and a detailed description of their structure, function and operation is not necessary for a complete understanding of the present invention.

Grain which has been separated by the threshing and separating mechanism 18 falls into the grain cleaning system 100. Within the grain cleaning system 100, the grains fall onto the first grain pan 102 and are then transported to the pre-cleaning sieve positioned above the second grain pan. Grain is then processed to the upper sieve 104 and then the lower sieve 106. The first grain pan 102 collects the separated grain particles and transports the mixture of chaff and grain to the front end of a pre-cleaning sieve or directly to an upper sieve 104. The pre-cleaning sieve separates a first amount of grain kernels from the total mass of crop material and delivers its residual fraction to the upper sieve 104. The upper sieve 104 separates the small fraction from the larger particles. The residual fraction of chaffs, short straw and other sieve losses leaves the back side of the upper sieve 104 while the separated fraction is processed by the lower sieve 106. The lower sieve 106 separates the clean grain fraction from the return flow fraction.

Referring to FIG. 3, the grain cleaning system 100 includes a blower 110 having a fan 112 and a housing 114 that houses or substantially houses the fan 112. The fan 112 can be any fan applicable for a grain cleaning system of an agricultural combine, thus a detailed description of such fans is not necessary for a complete understanding of the present invention. However, exemplary fans applicable to the present invention include a transverse fan as disclosed in detail in U.S. Pat. No. 8,052,374, the entire disclosure of which is hereby incorporated by reference herein. The fan 112 rotates about an axis 116 (that extends into the page as shown in FIG. 3) to provide for a flow of high velocity air to an inlet end 118 of the cleaning shoe 108. As used herein, the term "high velocity air" is used to refer to a flow of air generated by the blower 110. The blower 110 provides and directs a flow of high velocity air into the cleaning shoe 108 to clear and clean the cleaning shoe 108 of material other than grain and to help maintain operations of the cleaning shoe 108 at normal speeds.

Figure 9:
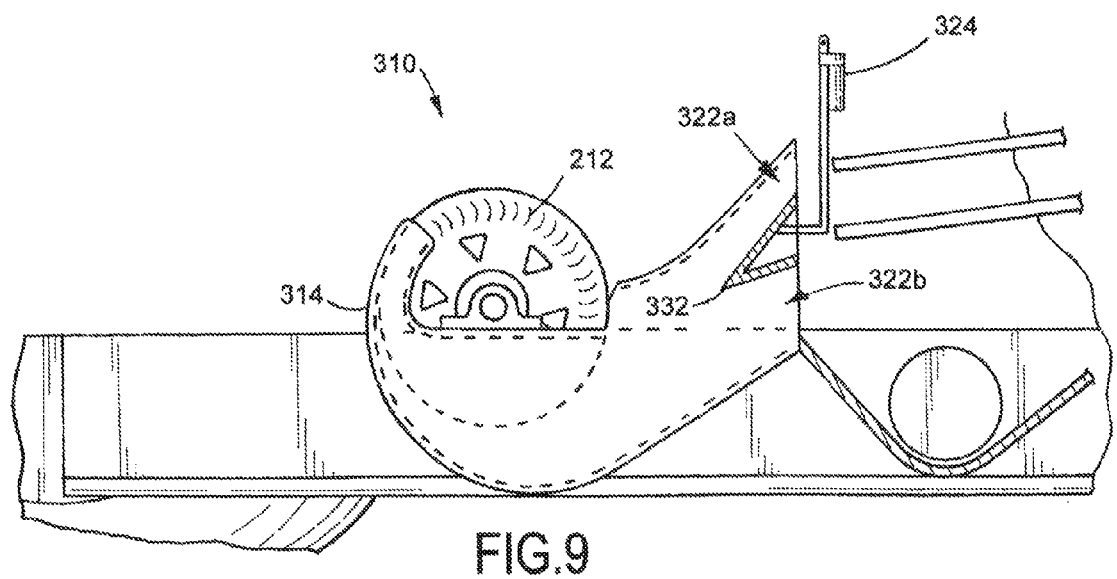
FIG. 9 is a partial side elevation view of a grain cleaning system in accordance with yet another preferred embodiment of the present invention.

The housing 114 substantially encases the fan 112 and has an air inlet 120 and an air outlet 122. The outlet 122 directs the flow of air generated by the blower 110. The outlet 122 is oriented to direct the flow of air in the direction shown by arrows A. For purposes of illustration only, arrows A are shown in FIG. 3 to be at an angle relative to a longitudinal axis 124 of the cleaning shoe 108 or sieves 104, 106, however, the direction outputted by the outlet 122 can alternatively be substantially parallel to the longitudinal axis 124 of the cleaning shoe 108. The housing 114 can be configured as a single outlet housing 114 (FIG. 3) or as a dual outlet housing 314, as shown in FIG. 9, and further described below.

Referring to FIGS. 3 and 4, the housing 114 is configured as a split housing. In a first aspect of the present embodiment, the housing 114 includes a first portion e.g., an upper portion 126 and a second portion, e.g., a lower portion 128. The upper portion 126 is fixed in position so as to remain stationary. The lower portion 128 is split into a stationary base portion 130 and a moveable mobile portion 132 configured to move between a plurality of positions, such as a first position and a second portion.

The lower portion 128 is configured, as best shown in FIG. 3. The base portion 130 is configured to have a substantially circular or elliptical cross-section and extends to substantially encase or house the fan 112. The mobile portion 132 substantially forms the lower section of the outlet plenum or lower front end of the housing outlet 122.

The mobile portion 132 and the base portion 130 are configured to have an overlapping section 134. The overlapping section 134 is formed by having one of the mobile portion 132 and base portion 130 sized to have a width and depth slightly smaller than the other such that the smaller sized portion can be received within the other. Preferably, the base portion 130 is sized to be smaller than the mobile portion 132 so as to be received within a rear end 132a of the mobile portion 132. The size of the overlapping section 134 changes as the mobile portion 132 moves throughout its range of motion, but the overlapping section 134 always remains. The walls of the overlapping section 134 can include a seal (not shown) embedded within a seal groove formed within one of the walls of the base portion 130 or mobile portion 132.

The lower portion 128 and the upper portion 126 are also configured to have side walls that make up an overlapping section 136. The size of the overlapping section 136 changes as the mobile portion 132 and upper portion 126 move with respect to each other, however, the overlapping section 136 remains throughout the upper and mobile portions 126, 132 range of motion. Maintaining the overlapping section 136 throughout the entire range of motion of the upper and mobile portions 126, 132 with respect to each other allows for the housing 114 to effectively control the flow of air generated by the blower 110 out through the housing outlet 122. The side walls of the overlapping section 136 can include a seal (not shown) embedded within a seal groove formed within one of the side walls of the upper portion 126 or mobile portion 132.

As shown in FIG. 3, the lower portion 128 has a front end 136b and a rear end. The front end 136b forms part of the outlet 122. The rear end is formed by the base portion 130 and substantially covers the fan 112. When the mobile portion 132 of the lower portion 128 is moved between first and second positions, the front end 136b moves to either increase the size of the outlet opening 122 (FIG. 3) or decrease the size of the outlet opening 122 (FIG. 4). This feature of an adjustable housing outlet opening 122 advantageously provides for a means to increase the flow velocity of air generated by the blower 110 when the blower 110 is operating at a fixed or maximum RPM (revolutions per minute). This is especially advantageous when the blower 110 operates at a maximum output or RPM speed such that a higher velocity air flow cannot be generated by the blower fan. In other words, the air flow velocity generated by the blower 110 can be advantageously increased when the blower 110 is operating at a maximum capacity by decreasing the size of the outlet 122 to thereby increase the pressure and velocity of air exiting the outlet 122.

The housing 114 also advantageously provides a means to produce a pulse or a plurality of pulses of higher velocity air exiting the outlet 122 by moving between the first and second positions. For example, the lower portion 128 can be moved between first and second positions in a relatively short time frame, such as 1, 5, 10, or 15 second intervals or 1, 2, 3, 4, or 5 minute intervals to produce a pulse or a plurality of pulses of higher velocity air that is directed to the inlet end of the cleaning shoe 108.

Preferably, the mobile portion 132 of the lower housing 128 is configured to move about a plurality of positions by pivoting about the axis 116. As the mobile portion 132 pivots about axis 116, the mobile portion 132 moves between a first position (FIG. 3) and a second position (FIG. 4). The mobile portion 132 can be configured to move between positions by an actuator, a cylinder, a motor or by any other means suitable for the intended use of moving the mobile portion 132. Preferably, the mobile portion 132 is moved by an actuator 138.

In an alternative aspect, as shown in FIG. 16, the mobile portion 132 can be pivotably attached to the base portion 130 so as to pivot about axis 116' instead of axis 116. An actuator (not shown) can be appropriately connected to the mobile portion 132 to effectuate pivotable movement of the mobile portion 132 about axis 116'.

Figure 5:
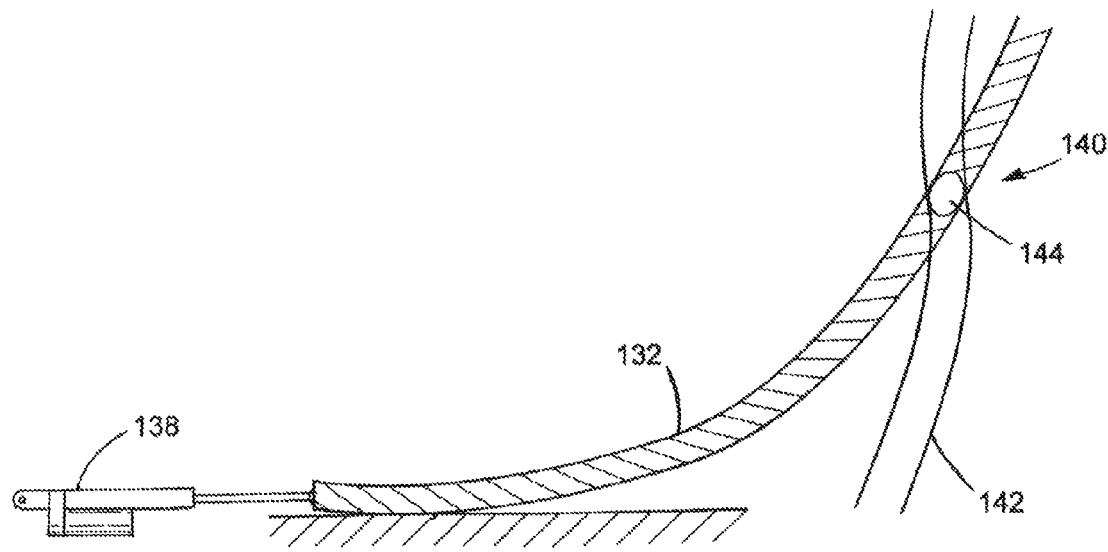
FIG. 5 is a partial side elevation view of a cam system of the grain cleaning system of FIG. 2.

Referring to FIG. 5, the housing 114 also includes a cam 140. The cam 140 can be positioned about the front end 136b of the mobile portion 132 of the lower housing 128, a rear end of the mobile portion 132a, or a front end of the base portion 130, and preferably, about a side wall of the lower housing 128. The cam 140 is structured similar to a barrel cam system that includes a cam slot 142 and a cam follower 144. The cam 140 directs the movement of the mobile portion 132 of the lower housing 128. Specifically, the cam 140 is configured to move the front end 136b in a substantially vertical direction to either increase or decrease the size of the outlet 122.

Referring to FIGS. 6 and 7, in a second aspect of the present embodiment, the present invention includes a housing 214 having a first portion e.g., a rear portion 230 and a second portion, e.g., a front portion 226. The rear portion 230 is fixed in position so as to remain stationary. The front portion 226 is split from the rear portion 230 and movable between a plurality of positions, such as a first position and a second portion. Preferably, the front portion 226 is split from the rear portion 230 about a substantially vertical plane or slightly angled from a vertical plane. However, the front portion 226 and the rear portion 230 are configured to have an overlapping section 234. The overlapping section 234 is formed by having one of the front portion 226 and the rear portion 230 sized to have a width and depth slightly smaller than the other such that the smaller sized portion can be received within the other larger sized portion. Preferably, the rear portion 230 is sized to be smaller than the front portion 226 so as to be received within a rear end 226a of the front portion 226. The size of the overlapping section 234 changes as the front portion 226 moves throughout its range of motion, but the overlapping section 234 always remains.

Preferably, the front portion 226 is configured to move about a plurality of positions by pivoting about an axis 216. As the front portion 226 pivots about axis 216, the front portion 226 moves between a first position (FIG. 6) and a second position (FIG. 7). The front portion 226 can be configured to move between positions by an actuator, a cylinder, a motor or by any other means suitable for the intended use of moving the front portion 226. Preferably, the front portion 226 is moved by an actuator 238.

When in the first position (FIG. 6), the front portion 226 directs the flow of air exiting the housing 214 along the direction of arrows B. However, when the front portion 226 is moved to the second position (FIG. 7), the front portion 226 directs the flow of air exiting the housing 214 along the direction of arrow C. The direction of flow depicted by arrows B and C are different i.e., are at different angles relative to a horizontal plane, such as a horizontal ground plane. The foregoing feature of the housing 214 configured to redirect the flow of air exiting the housing 214 advantageously allows the cleaning system 100 the ability to better clear the cleaning shoe 108 when transient effects occur.

Referring to back to FIGS. 2 and 4, in a third aspect of the present embodiment, the upper portion 126 can alternatively be configured to move separately from the mobile portion 132. For example, the upper portion 126 can optionally be moved by an actuator 138' that is operatively connected to and in communication with a controller 142 (further discussed below). The upper portion 126 can pivot or be moved linearly to effectuate a change or redirection of flow exiting the outlet 122, similar to the embodiment of the housing 214 discussed above.

Figure 8:
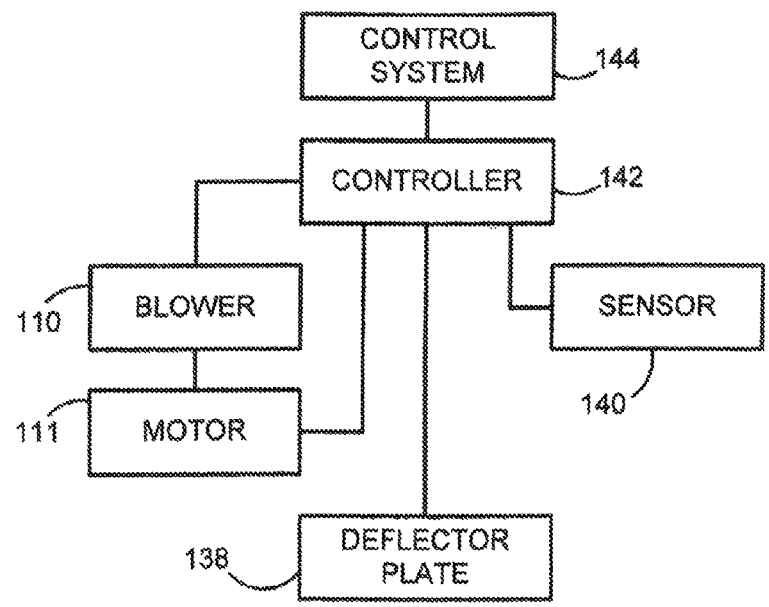
FIG. 8 is a schematic diagram of a control system of the present invention.

Referring back to FIG. 2 and to FIG. 8, the grain cleaning system 100 includes one or more, or a plurality of sensors 140. The sensor 140 is configured to sense or detect a number of operational parameters of, or associated with, the cleaning shoe 108 and/or blower 110. The sensor 140 can be attached to one of the cleaning shoe sieves 104, 106 to monitor the sieve in order to detect transient effects of crop material on the sieves 104, 106. The sensor 140 can also be attached to an outlet portion of the blower housing 114 to monitor an operational parameter of the blower, such as air flow direction, velocity and/or pressure. For example, the sensor 140 can be a presence detection sensor or a grain loss sensor, as disclosed e.g., in U.S. Pat. No. 7,403,846, the entire disclosure of which is incorporated by reference herein. Thus, the sensor 140 of the cleaning shoe sieve can e.g., detect the presence of a transient effect, the distribution and thickness of crop material passing through to the cleaning shoe 108 or grain losses. However, the sensor 140 is not limited to the foregoing means for detecting transient effects and can be any sensor capable of sensing any attribute related to transient effects suitable for the intended use of the present invention. Additionally, the present invention can include one or more, or a plurality of sensors 140 for detecting a plurality of attributes related to transient effects, such as volume, mass, density of crop materials, air flow rate, air pressure or air flow velocity exiting or entering the cleaning shoe 108.

Alternatively, the sensor 140 can be a flow rate sensor, air pressure or a flow velocity sensor 140' that is positioned about an exit end 108b of the cleaning shoe 108 to monitor and detect the flow rate, air pressure or flow velocity of air exiting the cleaning shoe 108. The flow rate, air pressure or flow velocity sensor 140' can also be positioned about the exit end 108b of the cleaning shoe 108 and above a receiving surface of sieves 104 or 106 to independently monitor an upper air flow stream flowing across the upper sieve 104 and a lower air flow stream flowing across the lower sieve 106, each of which exits the cleaning shoe 108 about a rear of the agricultural combine 10.

The flow rate, air pressure and/or flow velocity sensor 140' can also be positioned below sieves 104 and 106 to monitor the flow rate, air pressure and/or flow velocity of air passing through sieves 104 and 106. In this arrangement, a plurality of flow rate, air pressure and/or flow velocity sensors 140' may be used to monitor the flow rate, air pressure and/or flow velocity traversing the sieves 104 and 106 (i.e., monitoring vertical flow rate/vertical flow velocity).

The grain cleaning system 100 includes controller 142. The controller 142 can be part of the agricultural combine's control system 144 or an independent controller 142 in communication with the combine's control system 144. The controller 142 is operatively connected to and in communication with the blower 110 and the sensor 140 or each of the plurality of sensors 140, if applicable. The controller 140 can be embodied as a computer, a logic controller, separate electronic circuits or software associated with the control system 144.

When the sensor 140 is attached to one of the cleaning shoe sieves 104, 106, the controller 142 is configured to monitor the cleaning shoe 108. In monitoring the cleaning shoe 108, the controller 142 monitors the steady state throughput of the cleaning shoe operations. Steady state operations for the cleaning shoe 108 occurs when the distribution of crop materials traveling along the sieves of the cleaning shoe 108 are substantially evenly distributed throughout the entire receiving surface of the sieves and grain losses are at an acceptable level. Transient effects occur e.g., when a large aggregate mass of crop material accumulates or is deposited on the receiving surface of the cleaning shoe sieves. For example, when the combine 10 is traveling downhill, the movement of the threshed crop material over the first grain pan 102 slows down and a thick layer may develop on top thereof. When the combine 10 suddenly starts traveling uphill, this crop material will rapidly shift rearward resulting in a pile or larger than normal aggregate of crop material accumulation resulting in a pile of crop material traveling through the cleaning shoe 108. This resultant transient effect can be detected by the sensor 140 e.g., as a loss in sieve loss values. Additional details regarding the operation and apparatuses for measuring transient effects are disclosed in U.S. Pat. No. 7,403,846, the entire disclosure of which is hereby incorporated by reference herein. In sum, the sensor 140 detects a change in the operational parameter of steady state throughput through the cleaning shoe 108.

Upon detection of a transient effect within the cleaning shoe 108, the controller 142 redirects the flow of air, air flow pressure, and/or air flow velocity generated by the blower 110 about the inlet end of the cleaning shoe 108 to a second direction, a second air flow pressure, and/or a second air flow velocity in response to detecting a transient effect of crop material on the cleaning shoe sieves. This can be accomplished by moving the front portion 226 of the blower 110 as discussed above. That is, when a transient effect occurs within the grain cleaning system 100, the sensor 140 detects the transient effects and communicates the presence of the transient effect to the controller 142. The controller 142 then moves the front portion 226 to a predetermined position to cause the flow of air exiting the housing 214 to be redirected to a second direction that is different than the first direction, air pressure to be changed i.e., increased or decreased, and/or air flow velocity to be changes, i.e., increased or decreased, to clear or diminish the transient effect. The predetermined position can be one of a number of predetermined positions stored in a memory of the controller 142 associated with the position of the detected transient effect or type of transient effect detected. In sum, redirecting the flow of air generated, air flow pressure, and/or air flow velocity generated by the blower 110 and entering the cleaning shoe 108 advantageously reduces aggregate accumulation of crop material and promotes optimal air flow distribution through the cleaning shoe 108.

In redirecting the flow of air entering the cleaning shoe, the controller 142 can also be configured to redirect the flow of air so as to produce an oscillating pattern of air flow that enters the cleaning shoe 108. This can be accomplished e.g., by oscillating the front portion 226 between first and second positions, or throughout its entire range of motion in a repetitive manner.

After the controller 142 redirects the flow of air entering the cleaning shoe 108 to the second direction, the controller 142 continues to monitor the cleaning shoe 108 for transient effects. If after a predetermined period of time has lapsed since the controller 142 redirected the air flow and the transient effect is still detected, the controller 142 can be configured to move the front portion 226 to another position to again redirect the flow of air to a third position. Thereafter, this process of redirecting the flow of air entering the cleaning shoe 108 can be repeated until the transient effect is no longer detected. Upon detecting an absence of transient effects, the controller 142 redirects the flow of air back to the first direction or a direction associated with a predetermined steady state operation condition.

As discussed above, the sensor 140 can be an air flow rate or air flow velocity sensor 140' that is attached to the exit end 108a of the cleaning shoe 108. In this arrangement, the controller 140 is configured to monitor and detect one of a flow rate and flow velocity of air flow exiting the cleaning shoe 108 in order to assess the operational efficiency of the cleaning system 100. Such flow rate and flow velocity sensors 140' are known in the art and a detailed description of their structure, function and operation is not necessary for a complete understanding of the present invention. In sum, the sensor 140' detects a change in the operational parameter of output air flow rate or velocity of the cleaning shoe 108.

The controller 142 and sensor 140' operate substantially the same as described above when used in conjunction with sensor 140, except that the controller 142 is now configured to redirect the flow of air exiting the blower housing 114 upon detecting a change in flow rate or flow velocity exiting the cleaning shoe 108.

The foregoing description of the cleaning system 100 has been described with reference to a single outlet blower 110. However, referring to FIG. 9, in accordance with another preferred embodiment, the split housing 114 can equally be applicable to a dual outlet blower housing 314. In a dual outlet blower embodiment, the dual outlet blower housing 314 includes an upper outlet 322a and a lower outlet 322b. The upper and lower outlets 322a, 322b are formed from the housing 314 exterior walls and an internal air duct member 332. The air duct member 332 splits the air flow generated by the fan 312 to exit the housing 314 through either the upper outlet 322a or the lower outlet 322b. Additional dual outlet blower housings applicable to the present invention are disclosed in U.S. Patent Application Publication No. 2002/0037758 and U.S. Pat. No. 3,813,184, the entire disclosures of which are hereby incorporated by reference in their entirety.

The air duct member 332 can optionally be configured to be moveable between a first position and a second position, or a plurality of positions relative to the housing 314. The air duct member 332 can be adjustably mounted to the blower housing 314 and moved by an actuator, a cylinder, a motor or the like. Preferably, the air duct member 332 is operatively connected to and moved by one or more actuators 324 to move the air duct member 332 in the vertical direction i.e., upwards and downwards. Alternatively, the air duct member 332 can be configured to pivot about an axis extending lengthwise across the housing 314 to allow for a reduction or enlargement of the upper and lower outlets 322a, 322b. The actuator 324 and blower 310 are operatively connected to and in communication with the controller 142, which is also operatively connected to and in communication with sensors 140. The sensors 140 are as described above in the single outlet blower embodiment of the present invention.

Thus, the controller 142 is configured to move the air duct member 332 of the housing 314 in response to the sensor 140 detecting a change in an operational parameter of, or associated with, the cleaning shoe 108. For example, when the sensor 140 detects a decreased flow of air exiting the upper sieve section of the cleaning shoe 108, the controller 142 moves the air duct member 332 upwards and/or downwards to cause an increase or change in air flow velocity exiting the upper outlet 332a or lower outlet 332b.

Figure 10:
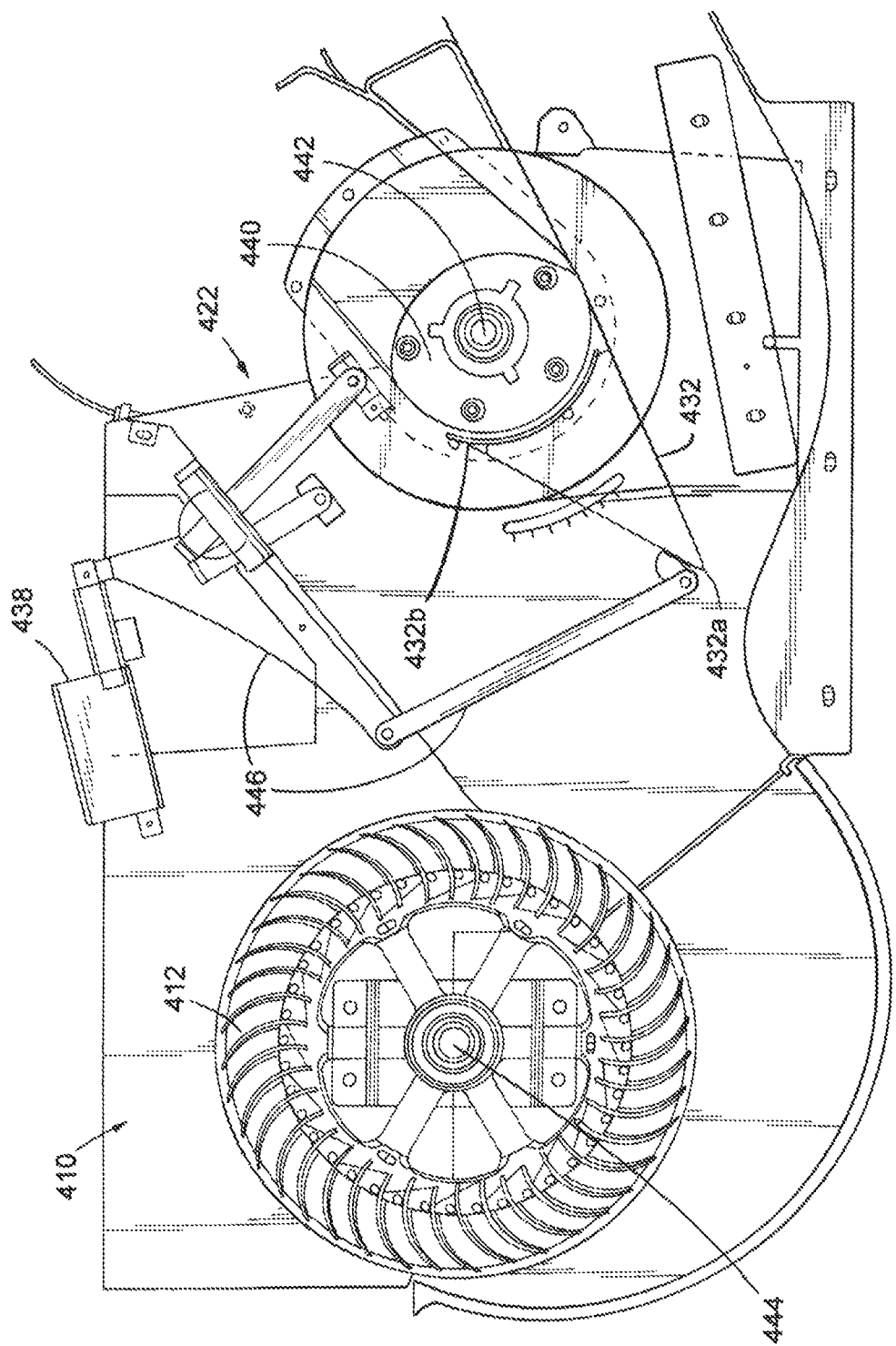
FIG. 10 is a partial side elevation view of a grain cleaning system in accordance with a further preferred embodiment of the present invention.

Referring to FIGS. 10 and 11, in a further embodiment, the present invention provides a grain cleaning system 100 that includes the blower 410 and a moveable air deflector 432 positioned downstream of the blower 410. The air deflector 432 is preferably configured as shown in FIGS. 10 and 11 having a substantially triangular cross-section. The air deflector 432 has a tip 432a and a concave tail portion 432b for mounting to a cylindrical member 440 of the agricultural combine 10 that is positioned upstream of an outlet 422 of the blower 410. The air deflector 432 is pivotally mounted to cylindrical member 440 so as to pivot about an axis 442 substantially parallel to an axis of rotation 444 of the fan 412. When mounted to the cylindrical member 440, the air deflector's tip 432 is upstream of the flow of air exiting the blower 410 at the outlet 422 while the tail portion 432b is downstream of the tip 432a.

The air deflector 432 can be moved to pivot about the axis 442 by one or more actuators 438 or motors. The actuator 438 is connected to the air deflector 432 by a linkage 446, which can be attached to the air deflector 432 about any number of positions along a longitudinal length of the air deflector 432. Alternatively, the actuator 438 can be connected to the cylindrical member 440 to which the air deflector 432 is rigidly attached to pivot the cylindrical member 440 and the air deflector 432.

The air deflector 432 is also operatively connected to and in communication with the controller 142. The controller 142 is configured to control and move the air deflector 432 about a plurality of positions relative to a direction of flow of the air entering the cleaning shoe 108.

The air deflector 432 is preferably configured and oriented to direct a flow of air generated by the blower 410 into upper and lower air streams. The upper air stream is directed to serve as a primary air flow stream for upper sieve 104 while the lower air stream is directed to serve as a primary air flow stream for lower sieve 106. The air deflector 432 advantageously provides the ability to focus air flow at higher velocities across individual sieves 104, 106 of the cleaning shoe 108.

The controller 142 operatively connected to and in communication with the air deflector 150 can also be configured with a set of defined ratios for air flow divided between the upper and lower streams stored in a memory. The ratios for air flow between the upper and lower streams are defined based upon the flow rate or flow velocity exiting the cleaning shoe 108. Specifically, the flow ratios (of either flow rate or velocity) of the upper and lower streams are inversely proportional to the measured rate of flow exiting the exit end of the cleaning shoe 108. For example, when a transient effect occurs within the cleaning system, the measured rate of flow exiting the exit end of the cleaning shoe 108 at the upper sieve 104 may be less than that of the lower sieve 106. In this case, the controller 142 can reposition the air deflector 432 to divert e.g., ⅔ of the air flow generated by the fan 412 to upper stream which is directed to flow across the upper sieve 104 and ⅓ of the air flow generated to the lower stream which is directed to flow across the lower sieve 106. Alternatively, the ratio of flow to the upper sieve can be e.g., ⅞, ¾ or ⅝ of the air flow generated by the fan 412. In this configuration, the cleaning shoe 108 is configured with individual sensors 140 for sensing the flow rate or flow velocity exiting the cleaning shoe 108 at a level of the upper sieve 104 and the lower sieve 106.

The controller 142 can also be operatively connected to and in communication with a motor 111 of the blower 110 and one or more sensors 140. In this configuration, the controller 142 is configured to modify the speed of rotation of the blower's fan in response to detecting a change from steady state conditions of an operational parameter of the cleaning system. Such operational parameters include a transient effect on a sieve of the cleaning shoe 108, an outlet flow rate of the cleaning shoe 108, an outlet flow velocity of the cleaning shoe 108, or combinations thereof.

Figure 12:
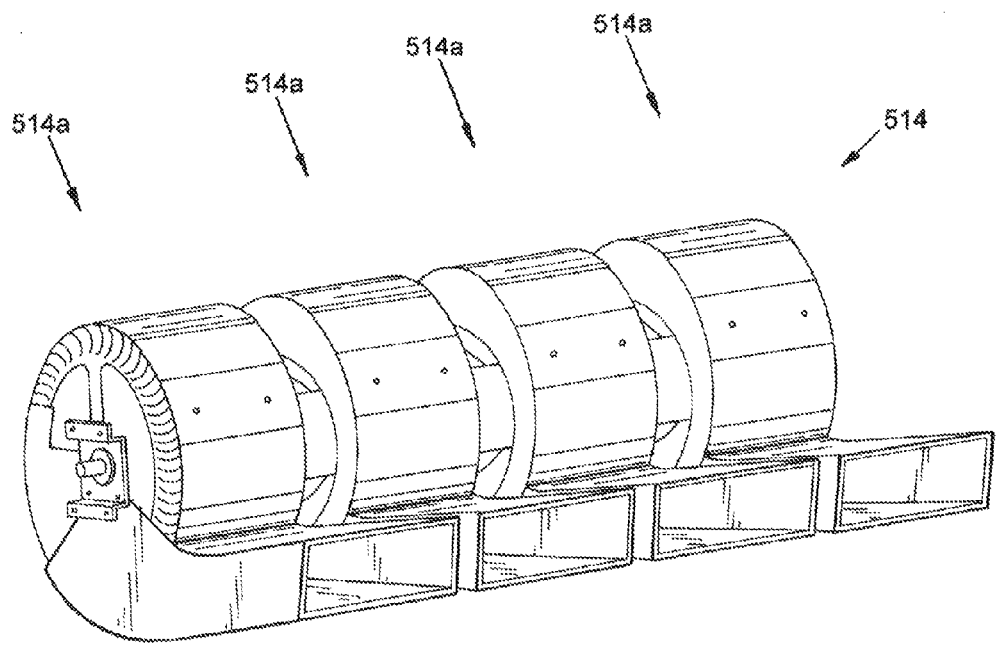
FIG. 12 is a perspective view of a grain cleaning system in accordance with another preferred embodiment of the present invention.

While the above described embodiments have been described with reference to a single blower housing (see e.g., FIG. 11), the foregoing embodiments described above can be configured with a blower having multiple blower housings 514, as shown e.g., in FIG. 12. In such a multiple blower housing configuration, each individual housing 514a is configured with an actuator to move the respective portions of the housing 514 between first and second positions to effectuate a change in air flow direction, air flow rate or air flow velocity exiting the housing 514, as further described in the above embodiments.

Referring back to FIGS. 1-4, in operation, the agricultural combine 10 harvests crop material that is received through the feederhouse 20 and travels to the threshing and separating section 18. The processed crop material e.g., grain, then passes through the combine 10 to the grain pans and sieves 104, 106 that are oscillated generally back-and-forth for transporting threshed and separated grain from the first grain pan 102 to the pre-cleaning sieve and the second grain pan and therefrom to the sieves 104, 106. The same oscillatory movement spreads the grain across the sieves 104, 106, while permitting the passage of cleaned grain by gravity through the apertures of these sieves. The grain on the sieves 104, 106 is subjected to a cleaning action by the blower 110 which provides high velocity air flow through the sieves to remove chaff and other impurities such as dust from the grain by making this material airborne for discharge from the combine 10. Clean grain then falls to a clean grain auger (not shown) in a clean grain auger trough and is subsequently transferred by the auger and an elevator mechanism (not shown) to the grain tank 14. Incompletely threshed ears, the so-called "tailings," do not pass through the upper sieve 104, but upon reaching the end thereof, fall to a tailings auger (not shown) in a tailings auger trough. The tailings are transported sideways by this auger to a separate rethresher and returned by a tailings elevator to the first grain pan 102 for repeated cleaning action. Impellers at the upper end of the tailings elevator spread the returned crop over the full width of the grain pan 102. The above-described mechanism of the tailings auger, the rethresher and the tailings elevator is also referred to as to a "return flow system." Additional details regarding the structure and operation of the cleaning system 100 is discussed in detail in U.S. Pat. No. 7,403,846, the entire disclosure of which is hereby incorporated by reference herein.

As mentioned above, overload in the upper sieve 104 of the grain cleaning system 100 may result in considerable crop loss. Throughout the description, there will be referred to a variation in the slope of the field as a cause for temporary overload of the upper sieve in a grain cleaning system. However, it should be clear from the present description that overload problems caused by other transient effects, e.g. higher yield load on certain field spots or changes to threshing settings of the harvester, may be solved as well with the improved method according to the present invention.

Figure 13:
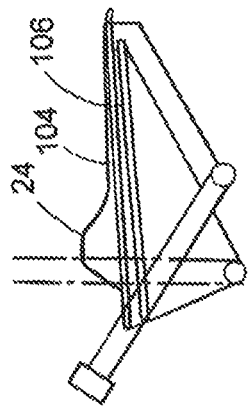
FIG. 13 is side elevation view of the grain cleaning system of FIG. 2 illustrating a transient effect on a sieve of the grain cleaning system.

For exemplary purposes only, the foregoing operation of the present invention will be described with respect to detecting transient effects within the cleansing shoe 108 of the agricultural combine 10. As shown in FIG. 13, transient effects will result e.g., in an aggregate heap of crop material on the upper sieve 104. For example, while the combine harvester is travelling downhill, the movement of the threshed crop material over the first grain pan 102 slows down and a thick layer may develop on top thereof. When the harvester suddenly starts travelling uphill, this material will rapidly shift rearwardly and make a pile of threshed material 24 on a front section of the upper sieve 104. This local pile of crop material 24 will move backwards on the upper sieve 104 until it leaves the machine at the end of the upper sieve 104, which can be registered e.g., as a sudden increase of a sieve loss signal. The sudden increase of sieve losses can be detected by monitoring consequent sieve loss values with sensor 140.

Figure 13A:
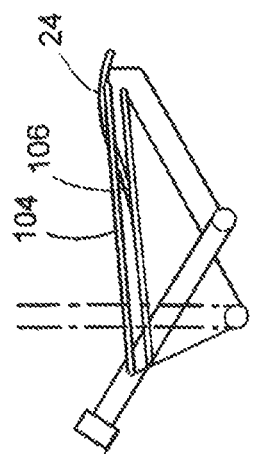
FIG. 13A is side elevation view of the grain cleaning system of FIG. 13 illustrating an abatement of the transient effect on a sieve of the grain cleaning system.

The presence of an aggregate accumulation of crop material 24 is detected by the sensor 140, which then signals the controller 142 to redirect the flow of air generated by the blower 110. The redirected flow of air will result in a breakdown of the aggregate accumulation of crop material which aids in maintaining optimal processing parameters and conditions for the cleaning shoe 108, as shown in FIG. 13A. That is, maintaining optional processing parameters and conditions results in less sieve losses and higher yields of harvested crop materials.

Figure 14:
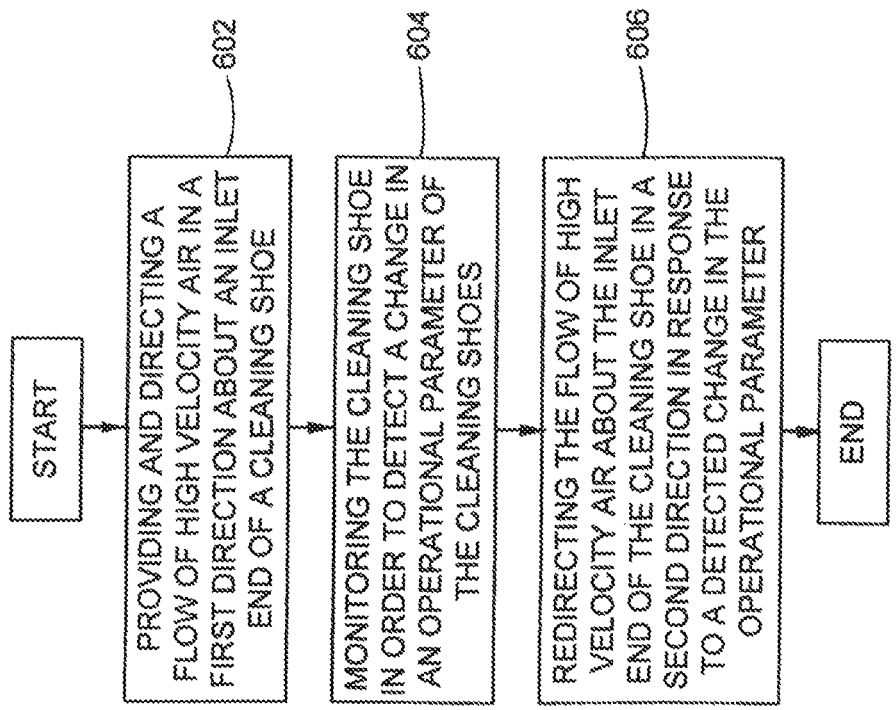
FIG. 14 is a flow diagram illustrating a method of clearing a grain cleaning system in accordance with another preferred embodiment of the present invention.

Referring to FIG. 14, in accordance with another preferred embodiment, the present invention provides for a method of clearing a grain cleaning system 100 of an agricultural combine. The method includes the step of providing and directing a flow of high velocity air in a first direction about an inlet end of a cleaning shoe 108. The flow of high velocity air can be provided for and directed by a blower 110 (Step 602). The cleaning shoe 108 extends along a direction substantially parallel to a longitudinal direction of the agricultural combine 10 i.e., a front to back direction. The method further includes the step of monitoring the cleaning shoe 108 in order to detect a change in an operational parameter of the cleaning shoe 108 (Step 604). Such operational parameters monitored can include transient effects on a sieve of the cleaning shoe 108, flow rates, and/or flow velocities exiting the cleaning shoe 108 or passing through sieves of the cleaning shoe 108. Further, the method includes the step of redirecting the flow of high velocity air about the inlet end of the cleaning shoe 108 in a second direction in response to a detected change in the operational parameter (Step 606). The second direction is a direction that is different than that of the first direction and can include a plurality of directions that is inclusive or exclusive of the first direction.

Figure 15:
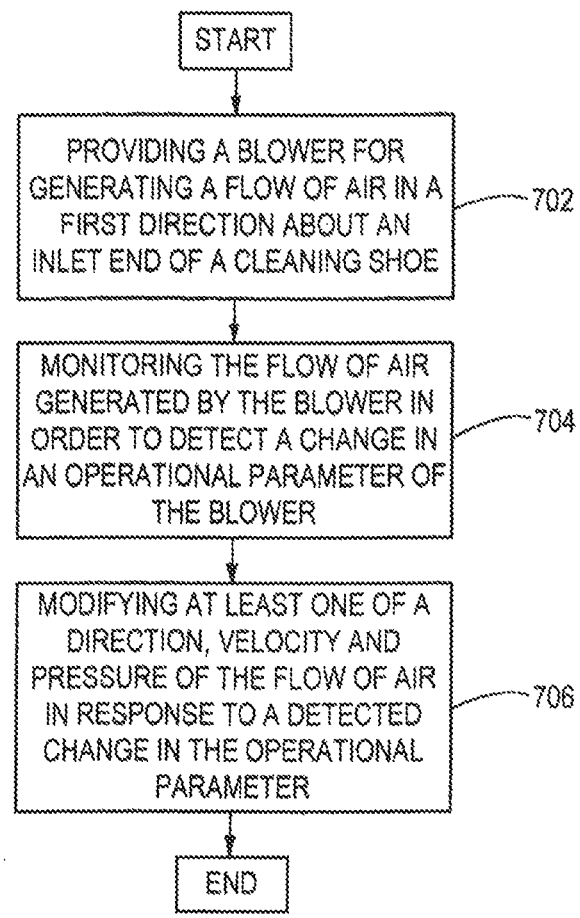
FIG. 15 is a flow diagram illustrating another method of clearing a grain cleaning system in accordance with a preferred embodiment of the present invention.

Referring to Referring to FIG. 15, in accordance with yet another preferred embodiment, the present invention provides for a method of clearing a grain cleaning system of an agricultural combine. The method includes the step of providing a blower for generating a flow of air in a first direction about and inlet end of a cleaning shoe (Step 702) and monitoring the flow of air generated by the blower in order to detect a change in an operational parameter of the blower (Step 704). The method further includes the step of modifying at least one of a direction, velocity and pressure of the flow of air in response to a detected change in the operational parameter (Step 706).

Referring to FIG. 17, in accordance with another preferred embodiment, there is shown a blower 610 having a housing 614 that includes an outer housing wall 616 and an inner housing wall 618. The outer housing wall 616 remains stationary. The inner housing wall 618, which is configured similar to mobile portion 132, is attached to the housing 614 so as to move between first and second positions, similar to mobile portion 132 described above. That is, the inner housing wall 618 is configured to pivot about axis 116 within the outer housing wall 616 to effectuate a change in direction, pressure, and/or velocity of a flow of air exiting the blower 610.

It will be appreciated by those skilled in the art that changes could be made to the embodiments described above without departing from the broad inventive concept thereof. For example, additional components and steps can be added to the various grain cleaning system embodiments. It is to be understood, therefore, that this invention is not limited to the particular embodiments disclosed, but it is intended to cover modifications within the spirit and scope of the present invention as defined by the appended claims.

We claim:

1. A method of clearing a grain cleaning system of an agricultural combine comprising the steps of:
providing and directing a flow of high velocity air from a blower in a first direction about an inlet end of a cleaning shoe;
monitoring the cleaning shoe with a sensor in order to detect a change in an operational parameter of the cleaning shoe; and
redirecting the flow of high velocity air about the inlet end of the cleaning shoe in a second direction in response to a detected change in the operational parameter;
a controller operatively connected to and in communication with the blower and the sensor,
wherein the controller is configured to redirect the flow of air in the second direction by varying at least one of the location and the size of an outlet of the blower in response to a detected change in the operational parameter.

2. The method of claim 1, further comprising redirecting the flow of high velocity air to the first direction in the absence of a change in the operational parameter.

3. The method of claim 1, wherein the step of monitoring the cleaning shoe includes one of monitoring transient effects of crop material on a sieve of the cleaning shoe, monitoring a flow rate of the high velocity air about an exit end of the cleaning shoe, and monitoring a flow velocity of the high velocity air exiting the exit end of the cleaning shoe, air pressure, or combinations thereof.

4. The method of claim 1, wherein the redirecting step comprises redirecting the flow of high velocity air to oscillate about the inlet end of the cleaning shoe.

5. The method of claim 1, wherein the blower includes a fan, and further comprising modifying the speed of rotation of the fan in response to detecting a change in the operational parameter.

6. The method of claim 1, wherein the operational parameter is a transient effect on the sieve, a flow rate of the flow of air about the cleaning shoe, a flow velocity of the flow of air about the cleaning shoe, air pressure, or combinations thereof.

7. The method of claim 1, wherein the blower comprises a housing having:
a first portion,
a second portion movable between a first position and a second position,
the outlet of the blower is formed by at least one of the first and second portions; and
a fan rotatable within the housing,
wherein a size of the outlet changes as the second portion is moved between the first and second positions.

8. A method of clearing a grain cleaning system of an agricultural combine comprising the steps of:
providing and directing a flow of high velocity air from a blower in a first direction about an inlet end of a cleaning shoe;
monitoring the cleaning shoe with a sensor in order to detect a change in an operational parameter of the cleaning shoe; and
redirecting the flow of high velocity air about the inlet end of the cleaning shoe in a second direction in response to a detected change in the operational parameter;
wherein the blower comprises a housing having a first portion, a second portion movable between a first position and a second position, wherein the flow of high velocity air is redirected by the controller moving at least the section portion of the housing changing the outlet of the blower.

* * * * *